United States Patent
Kim et al.

(10) Patent No.: US 10,207,738 B2
(45) Date of Patent: Feb. 19, 2019

(54) APPARATUS AND METHOD FOR COMPENSATING FOR STEERING ANGLE SIGNAL AND MOTOR ANGLE SIGNAL OF MDPS SYSTEM

(71) Applicant: HYUNDAI MOBIS CO., LTD., Seoul (KR)

(72) Inventors: Cheon Kyu Kim, Seoul (KR); Ji Hoon Yoo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 114 days.

(21) Appl. No.: 15/375,873

(22) Filed: Dec. 12, 2016

(65) Prior Publication Data

US 2017/0166241 A1   Jun. 15, 2017

(30) Foreign Application Priority Data

Dec. 14, 2015 (KR) .................. 10-2015-0178087

(51) Int. Cl.
*B62D 15/02* (2006.01)
*B62D 5/04* (2006.01)

(52) U.S. Cl.
CPC ....... *B62D 15/0245* (2013.01); *B62D 5/0457* (2013.01)

(58) Field of Classification Search
None
See application file for complete search history.

(56) References Cited

U.S. PATENT DOCUMENTS

2008/0023255 A1* 1/2008 Colosky ............. B62D 15/0215
                                                           180/444

FOREIGN PATENT DOCUMENTS

KR    10-2015-0065421    6/2015

* cited by examiner

*Primary Examiner* — Mussa A Shaawat
*Assistant Examiner* — Michael V Kerrigan
(74) *Attorney, Agent, or Firm* — H.C. Park & Associates, PLC

(57) ABSTRACT

An apparatus for compensating a steering angle signal and motor angle signal of an MDPS system may include: a motor torque compensator configured to compensate for mechanical deformation; an angular speed compensator configured to compensate for a difference between a steering angle and a motor angle; a sensor characteristic compensator configured to compensate for a steering position error of the steering angle sensor; and a hysteresis compensator configured to compensate for a hysteresis characteristic of the MDPS system.

8 Claims, 2 Drawing Sheets

APPARATUS AND METHOD FOR COMPENSATING FOR STEERING ANGLE SIGNAL AND MOTOR ANGLE SIGNAL OF MDPS SYSTEM

CROSS-REFERENCES TO RELATED APPLICATIONS

The present application claims priority to Korean application number 10-2015-0178087, filed on Dec. 14, 2015, which is incorporated by reference in its entirety.

BACKGROUND OF THE INVENTION

The present invention relates to an apparatus and method for compensating a steering angle signal and motor angle signal of an MDPS (Motor-Driven Power Steering) system, and more particularly, an apparatus and method for compensating a steering angle signal and motor angle signal of an MDPS system, which synchronizes a steering angle signal and a motor angle signal.

A power steering of a vehicle is a power-based steering apparatus, and serves to assist a driver with a steering wheel operation. Such a power steering generally uses hydraulic pressure. Recently, however, the use of an MDPS system using the force of a motor has increased. That is because the MDPS system has a smaller weight and occupies a smaller area than the existing hydraulic power steering system, and does not require an oil change.

Unlike the existing hydraulic power steering system, the MDPS system generates a torque through current control of the motor by a control unit such as an ECU (Electronic Control Unit), and thus includes a variety of control logics for controlling the motor. Such control logics are divided into logic for implementing a steering feel desired by a driver, logic for improving the stability of the vehicle, and logic for improving the stability of the system. The control unit of the MDPS system controls the respective logics based on various parameters such as vehicle speed, torque signal, steering angle signal and motor angle signal.

Among the parameters, the steering angle and the motor angle are parameters required for implementing a sophisticated steering feel. For example, the steering angle can be calculated through post-processing for a signal measured by a steering angle sensor installed in a column assembly, and the motor angle can be calculated through post-processing for a signal measured through a motor angle sensor (an encoder of a motor).

In the related art, however, since the steering angle signal and the motor angle signal are not synchronized with each other, only one of the steering angle signal and the motor angle signal is used to design logic. Therefore, it is difficult to acquire desired steering logic and target performance.

The related art of the present invention is disclosed in Korean Patent Publication No. 10-2015-0065421 published on Jun. 15, 2015.

SUMMARY OF THE INVENTION

Embodiments of the present invention are directed to an apparatus and method for compensating a steering angle signal and motor angle signal of an MDPS system, which is capable of synchronizing a steering angle signal and a motor angle signal.

In one embodiment, an apparatus for compensating a steering angle signal and motor angle signal of an MDPS system may include: a motor torque compensator configured to compensate for mechanical deformation caused by a material between a steering angle sensor and motor angle sensor of the MDPS system, by applying a current compensation value to a current for controlling a motor that drives the MDPS; an angular speed compensator configured to compensate for a difference between a steering angle and a motor angle by an angular speed of the motor, based on the angular speed; a sensor characteristic compensator configured to compensate for a steering position error of the steering angle sensor depending on a steering position, based on the steering position and a steering direction; and a hysteresis compensator configured to compensate for a hysteresis characteristic of the MDPS system by applying a hysteresis compensation value to the steering angle signal, when the steering condition of a vehicle is changed from a standstill state to a steering state or the steering direction is changed.

The motor torque compensator may apply a preset current gain to a Q-axis current of the motor.

The angular speed compensator may calculate a compensation amount for the difference between the steering angle and the motor angle by multiplying the angular speed by a signal delay amount.

The sensor characteristic compensator may include a storage unit configured to store a compensation amount corresponding to a steering position and a steering direction.

The hysteresis compensator may calculate the hysteresis compensation value using the compensation amount stored in the storage unit.

In another embodiment, a method for compensating a steering angle signal and motor angle signal of an MDPS system may include: compensating for, by a compensation unit, mechanical deformation caused by a material between a steering angle sensor and a motor angle sensor of the MDPS system, by applying a current compensation value to a current for controlling a motor that drives the MDPS; compensating for a difference between a steering angle and a motor angle by an angular speed of the motor, based on the angular speed; compensating for a steering position error of the steering angle sensor depending on a steering position, based on the steering position and a steering direction; and compensating for a hysteresis characteristic of the MDPS system by applying a hysteresis compensation value to the steering angle signal, when the steering condition of a vehicle is changed from a standstill state to a steering state or the steering direction is changed.

In the compensating for the compressive stress, the compensation unit may apply a preset current gain to a Q-axis current of the motor.

In the compensating for the difference between the steering angle and the motor angle, the compensation unit may calculate a compensation amount for the difference between the steering angle and the motor angle by multiplying the angular speed by a signal delay amount.

In the compensating for the hysteresis characteristic, the compensation unit may calculate the hysteresis compensation value using a left direction error map of the steering position error and a right direction error map of the steering position error.

DESCRIPTION OF SPECIFIC EMBODIMENTS

Hereafter, an apparatus and method for compensating a steering angle signal and motor angle signal of an MDPS system in accordance with an embodiment of the invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
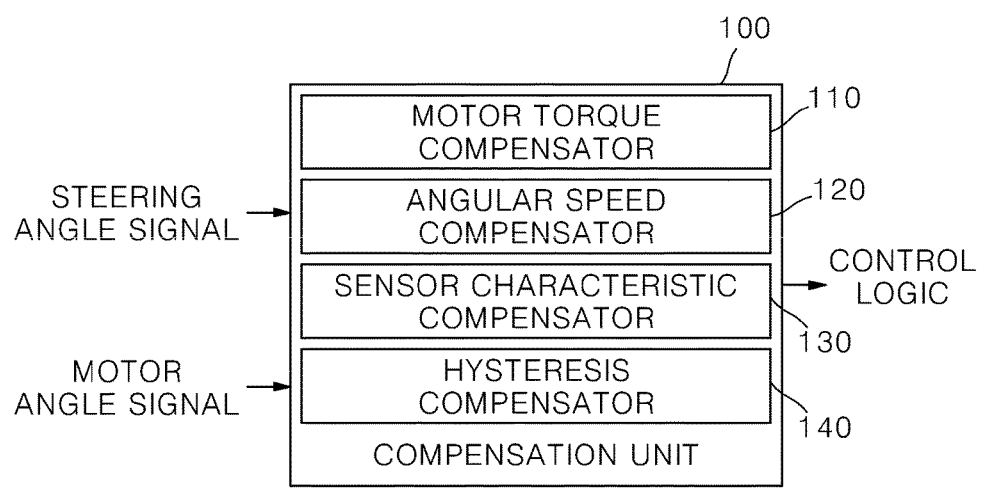
FIG. 1 is a block diagram illustrating the configuration of an apparatus for compensating a steering angle signal and motor angle signal of an MDPS system in accordance with an embodiment of the present invention.

FIG. 1 is a block diagram illustrating the configuration of an apparatus for compensating a steering angle signal and motor angle signal of an MDPS system in accordance with an embodiment of the present invention. Referring to FIG. 1, the apparatus for compensating a steering angle signal and motor angle signal of an MDPS system in accordance with the embodiment of the present invention will be described as follows.

As illustrated in FIG. 1, the apparatus for compensating a steering angle signal and a motor angle signal of an MDPS system in accordance with the embodiment of the present invention includes a compensation unit 100 which receives a steering angle signal from a steering angle sensor, receives a motor angle signal from a motor angle sensor, compensates the received signals and outputs the corrected signals to control logic. The compensation unit 100 includes a motor torque compensator 110, an angular speed compensator 120, a sensor characteristic compensator 130 and a hysteresis compensator 140.

That is, the steering angle signal outputted from the steering angle sensor and the motor angle signal outputted from the motor angle sensor may not be synchronized with each other, due to mechanical deformation caused by a material between the steering angle sensor and the motor angle sensor, a difference between the steering angle and the motor angle by the angular speed of the motor, a steering position error of the steering angle sensor depending on a steering position, or a hysteresis characteristic of the MDPS system. For example, when the steering angle signal is 100 degrees after a specific time, the motor angle signal also needs to be 100 degrees after the specific time. However, due to the above-described factors, the steering angle and the motor angle signal may not be synchronized with each other.

In other words, the compensation unit 100 may perform compensation by applying a variety of calculated compensation amounts to the steering angle signal or the motor angle signal (for example, adding or subtracting a compensation amount to or from the steering angle signal or the motor angle signal).

Specifically, the motor torque compensator 110 may compensate for mechanical deformation caused by a material between the steering angle sensor and the motor angle sensor. For example, the mechanical deformation is caused by compressive stress a material between the steering angle sensor and the motor angle sensor. That is, the MDPS system has a mechanical characteristic that an elastic material excluding a torsion bar exists between the steering angle sensor and the motor angle sensor. The elastic material may cause compressive stress.

Since the compressive stress can be changed depending on a steering force (torque of the motor), the motor torque compensator 110 may perform compensation by applying a current compensation value to a current for controlling the motor. For example, the motor torque compensator 110 may apply the current compensation value by applying a preset current gain to a Q-axis current of the motor. At this time, the preset current gain may be designed according to the structure and specification of the MDPS system, and separately designed for each current value.

The angular speed compensator 120 may compensate for a difference between a motor angle and a steering angle by the angular speed of the motor. That is, due to the rotational angular speed of the steering, the steering angle and the motor angle may be desynchronized from each other. The angular speed compensator 120 may compensate for the desynchronization.

For example, the angular speed compensator 120 may calculate a compensation amount for the difference between the steering angle and the motor angle by multiplying an angular speed of the motor by a signal delay amount. At this time, the angular speed compensator 120 may acquire the angular speed of the motor by differentiating the motor angle. The signal delay amount indicates a difference in calculation cycle between the signals (for example, the steering angle signal and the motor angle signal).

The sensor characteristic compensator 130 may compensate for a steering position error of the steering angle sensor depending on a steering position. That is, the steering angle sensor has a structural characteristic that a non-linear characteristic exists depending on a steering position. The non-linear characteristic may differ depending on a steering direction (clockwise or counterclockwise direction). In other words, even at the same steering position, for example, a steering position of 100 degrees, a difference exists between a steering angle signal when steering is performed in the clockwise direction and a steering angle signal when steering is performed in the counterclockwise direction.

Thus, the sensor characteristic compensator 130 may include a storage unit (not illustrated) for storing a compensation amount corresponding to a steering position and a steering direction. The compensation amount means a steering position error of the steering angle sensor depending on a steering angle position.

The sensor characteristic compensator 130 may read a compensation amount corresponding to the current steering position and steering direction from the storage unit, and then perform compensation. At this time, the storage unit may store compensation amounts in the form of a lookup table, and the lookup table may be designed in advance, according to the characteristic of the MDPS system. The storage unit has a left direction error map and a right direction error map, respectively.

The hysteresis compensator 140 may compensate for a hysteresis characteristic of the MDPS system. As described above, the measurement characteristic may differ depending on a steering direction, even at the same steering position. Thus, when the steering direction is changed or steering is started in a standstill state, a difference between the steering angle signal and the motor angle signal may occur due to the hysteresis characteristic.

Thus, the hysteresis compensator 140 may compensate for the difference caused by the hysteresis characteristic. For example, the hysteresis compensator 140 may apply a hysteresis compensation value by applying a preset steering angle gain to the steering angle signal. At this time, the preset steering angle gain may be designed according to the structure and specification of the MDPS system, and separately designed for each steering angle.

For another example, the hysteresis compensator 140 may calculate a compensation amount by using the left direction error map and the right direction error map, direction judgment time and state transition value. The left direction error map and the right error direction map are determined by sensor characteristics. The direction judgment time is a required time to judge whether the steering direction is left or right. The state transition value is the weighted value to calculate the compensation amount by using the left direction error map and the right direction error map. The default of state transition value is 0.5. For example, when the steering direction is changed, the state transition value is increased or decreased during direction judgment time. The state transition value is finally 1(maximum) or 0(minimum). For example, if the state transition value is 1, the compensation amount only follows a right direction error map. And if the state transition value is 0, the compensation amount only follows a left direction error map. When the state transition value is among 1 and 0, the compensation amount is calculated by applying the weighted value in the left direction error map and in the right direction error map.

That is, the steering direction is right and the steering state is no changed, the sensor characteristic compensator 130 may read the compensation amount from in the right direction error map, because the state transition value is converged as 1.

Figure 2:
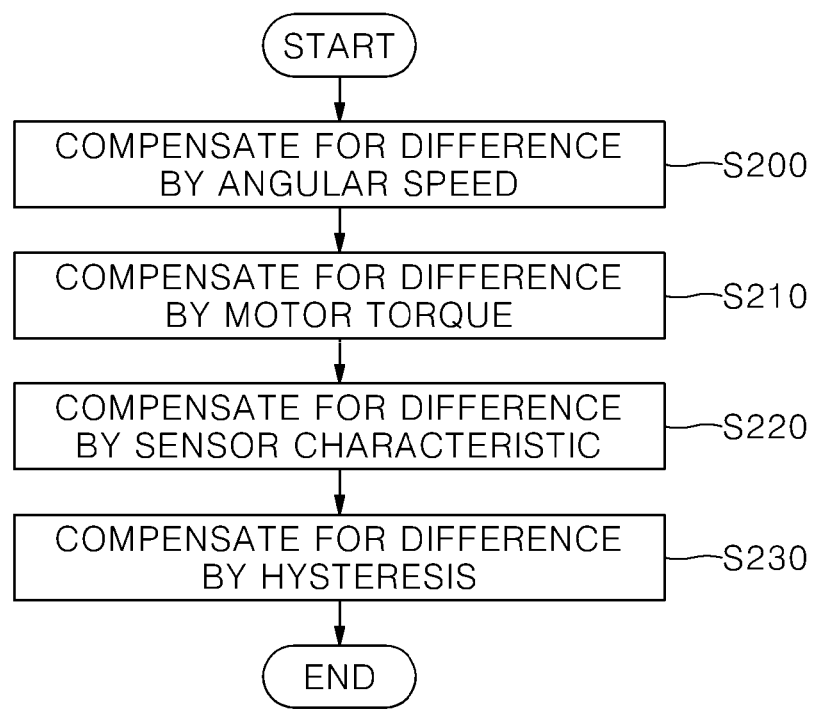
FIG. 2 is a flowchart illustrating a method for compensating a steering angle signal and motor angle signal of an MDPS system in accordance with an embodiment of the present invention.

FIG. 2 is a flowchart illustrating a method for compensating a steering angle signal and motor angle signal of an MDPS system in accordance with an embodiment of the present invention. Referring to FIG. 2, the method for compensating a steering angle signal and motor angle signal of an MDPS system in accordance with the embodiment of the present invention will be described as follows.

As illustrated in FIG. 2, the compensation unit 100 compensates for a difference between a steering angle and a motor angle by an angular speed of the motor, at step S200. For example, the compensation unit 100 may calculate a compensation amount for the difference between the steering angle and the motor angle by multiplying the angular speed of the motor by a signal delay amount. At this time, the compensation unit 100 may acquire the angular speed of the motor by differentiating the motor angle. The signal delay amount indicates a difference in calculation cycle between the signals (for example, the steering angle signal and the motor angle signal).

The compensation unit 100 compensates for a difference between the steering angle and the motor angle by torque of the motor, at step S210. That is, the MDPS system has a mechanical characteristic that an elastic material excluding a torsion bar exists between the steering angle sensor and the motor angle sensor. The elastic material may cause compressive stress.

Since the compressive stress can be changed depending on a steering force (torque of the motor), the compensation unit 100 may perform compensation by applying a current compensation value to a current for controlling the motor. For example, the compensation unit 100 may apply the current compensation value by applying a preset current gain to a Q-axis current of the motor.

The compensation unit 100 compensates for a difference between the steering angle and the motor angle by the non-linear characteristic of the steering angle sensor, at step S220. That is, the steering angle sensor has a structural characteristic that a non-linear characteristic exists depending on a steering position. The non-linear characteristic may differ depending on a steering direction (clockwise or counterclockwise direction).

Thus, the compensation unit 100 may include the storage unit (not illustrated) for storing a compensation amount corresponding to a steering position and a steering direction. The compensation unit 100 may receive a compensation amount corresponding to the current steering position and steering direction from the storage unit, and then perform compensation.

Finally, the compensation unit 100 compensates for a difference between the steering angle and the motor angle by the hysteresis characteristic of the MDPS system, at step S230. Even at the same steering position, the measurement characteristic may differ depending on a steering direction. Thus, when the steering direction is changed or steering is started in a standstill state, a difference between the steering angle signal and the motor angle signal may occur due to the hysteresis characteristic. Therefore, the compensation unit 100 may perform compensation for the steering position error of the steering angle sensor.

As described above, the apparatus and method for compensating a steering angle signal and motor angle signal of an MDPS system in accordance with the embodiments of the present invention can compensate for the compressive stress caused by the material between the steering angle sensor and the motor angle sensor, the difference between the steering angle and the motor angle by the angular speed of the motor, the non-linear characteristic of the steering angle sensor depending on the steering position, and the hysteresis characteristic of the MDPS system, and synchronize the steering angle signal and the motor angle signal with each other, thereby improving the degree of freedom in development of MDPS logic and accomplishing required target performance.

Although preferred embodiments of the invention have been disclosed for illustrative purposes, those skilled in the art will appreciate that various modifications, additions and substitutions are possible, without departing from the scope and spirit of the invention as is defined in the accompanying claims.

What is claimed is:

1. An apparatus for compensating a steering angle signal and motor angle signal of an MDPS (Motor-Driven Power Steering) system, comprising:
   a motor torque compensator configured to compensate for mechanical deformation caused by a material between a steering angle sensor and motor angle sensor of the MDPS system, by applying a current compensation value to a current for controlling a motor that drives the MDPS;
   an angular speed compensator configured to compensate for a difference between a steering angle and a motor angle by an angular speed of the motor, based on the angular speed;
   a sensor characteristic compensator configured to compensate for a steering position error of the steering angle sensor depending on a steering position, based on the steering position and a steering direction; and
   a hysteresis compensator configured to compensate for a hysteresis characteristic of the MDPS system by applying a hysteresis compensation value to the steering angle signal, when the steering condition of a vehicle is changed from a constant-steering state to a steering state or the steering direction is changed, wherein the angular speed compensator calculates a compensation amount for the difference between the steering angle and the motor angle by multiplying the angular speed by a signal delay amount.

2. The apparatus of claim 1, wherein the motor torque compensator applies a preset current gain to a Q-axis current of the motor.

3. The apparatus of claim 1, wherein the sensor characteristic compensator comprises a storage unit configured to store a compensation amount corresponding to a steering position and a steering direction.

4. The apparatus of claim 3, wherein the hysteresis compensator calculates the hysteresis compensation value using the compensation amount stored in the storage unit.

5. A method for compensating a steering angle signal and motor angle signal of an MDPS (Motor-Driven Power Steering) system, comprising:
   compensating for, by a compensation unit, mechanical deformation caused by a material between a steering angle sensor and a motor angle sensor of the MDPS system, by applying a current compensation value to a current for controlling a motor that drives the MDPS;
   compensating for a difference between a steering angle and a motor angle by an angular speed of the motor, based on the angular speed;
   compensating for a steering position error of the steering angle sensor depending on a steering position, based on the steering position and a steering direction; and
   compensating for a hysteresis characteristic of the MDPS system by applying a hysteresis compensation value to the steering angle signal, when the steering condition of a vehicle is changed from a constant steering state to a steering state or the steering direction is changed,
   wherein, in the compensating for the difference between the steering angle and the motor angle, the compensation unit calculates a compensation amount for the difference between the steering angle and the motor angle by multiplying the angular speed by a signal delay amount.

6. The method of claim 5, wherein, in the compensating for the compressive stress, the compensation unit applies a preset current gain to a Q-axis current of the motor.

7. A method for compensating a steering angle signal and motor angle signal of an MDPS (Motor-Driven Power Steering) system, comprising:
   compensating for, by a compensation unit, mechanical deformation caused by a material between a steering angle sensor and a motor angle sensor of the MDPS system, by applying a current compensation value to a current for controlling a motor that drives the MDPS;
   compensating for a difference between a steering angle and a motor angle by an angular speed of the motor, based on the angular speed;
   compensating for a steering position error of the steering angle sensor depending on a steering position, based on the steering position and a steering direction; and
   compensating for a hysteresis characteristic of the MDPS system by applying a hysteresis compensation value to the steering angle signal, when the steering condition of a vehicle is changed from a constant steering state to a steering state or the steering direction is changed,
   wherein, in the compensating for the hysteresis characteristic, the compensation unit calculates the hysteresis compensation value using a left direction error map of the steering position error and a right direction error map of the steering position error.

8. The method of claim 7, wherein, in the compensating for the compressive stress, the compensation unit applies a preset current gain to a Q-axis current of the motor.

* * * * *